US012732860B2

(12) United States Patent
Fu et al.

(10) Patent No.: US 12,732,860 B2
(45) Date of Patent: Sep. 8, 2026

(54) METHOD FOR DATA TRANSMISSION AND DEVICE

(71) Applicant: GUANGDONG OPPO MOBILE TELECOMMUNICATIONS CORP., LTD., Dongguan (CN)

(72) Inventors: Zhe Fu, Dongguan (CN); Qianxi Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 187 days.

(21) Appl. No.: 18/645,992

(22) Filed: Apr. 25, 2024

(65) Prior Publication Data

US 2024/0284244 A1 Aug. 22, 2024

Related U.S. Application Data

(63) Continuation of application No. PCT/CN2021/126810, filed on Oct. 27, 2021.

(51) Int. Cl.
*H04W 28/02* (2009.01)
*H04W 28/06* (2009.01)

(52) U.S. Cl.
CPC ....... *H04W 28/0268* (2013.01); *H04W 28/06* (2013.01)

(58) Field of Classification Search
CPC .. H04W 28/0268; H04W 28/06; H04W 28/02
See application file for complete search history.

(56) References Cited

U.S. PATENT DOCUMENTS

| | | | | |
|---|---|---|---|---|
| 12,134,698 B2 * | 11/2024 | Herd | B60C 1/0016 |
| 12,155,451 B2 * | 11/2024 | Ueki | H04B 7/155 |
| 2012/0147936 A1 * | 6/2012 | Rangan | H04L 1/188 709/217 |
| 2018/0098362 A1 * | 4/2018 | Yamauchi | H04L 1/08 |
| 2023/0032764 A1 * | 2/2023 | Dou | H04L 65/75 |

(Continued)

FOREIGN PATENT DOCUMENTS

| | | |
|---|---|---|
| CN | 110035461 | 7/2019 |
| CN | 111901072 | 11/2020 |

(Continued)

OTHER PUBLICATIONS

"3rd Generation Partnership Project; Technical Specification Group Radio Access Network; NR; Medium Access Control (MAC) protocol specification (Release 16)," 3GPP TS 38.321, Jun. 2021, v16.5.0.

(Continued)

*Primary Examiner* — Benjamin M Thieu
(74) *Attorney, Agent, or Firm* — Hodgson Russ LLP

(57) ABSTRACT

The present disclosure provides a method for data transmission and a device, where the method for data transmission includes the following. A terminal device performs transmission of an application data unit (ADU) according to first information from an access network (AN) device or stops the transmission of the ADU according to the first information from the AN device, where the first information includes related configurations and/or indications of the ADU.

19 Claims, 4 Drawing Sheets

NETWORK DEVICE

TERMINAL DEVICE

101, SEND FIRST INFORMATION, WHERE FIRST INFORMATION INCLUDES RELATED CONFIGURATIONS AND/OR INDICATIONS OF ADU

102, PERFORM TRANSMISSION OF ADU ACCORDING TO FIRST INFORMATION, OR STOP TRANSMISSION OF ADU ACCORDING TO FIRST INFORMATION

(56) References Cited

U.S. PATENT DOCUMENTS

| | | | | |
|---|---|---|---|---|
| 2023/0422336 | A1* | 12/2023 | Chen | H04W 76/15 |
| 2024/0137802 | A1* | 4/2024 | Guo | H04M 15/8016 |

FOREIGN PATENT DOCUMENTS

| | | |
|---|---|---|
| CN | 112887155 | 6/2021 |
| CN | 113543230 | 10/2021 |

OTHER PUBLICATIONS

Qualcomm Incorporated, "Potential Enhancements for Xr," 3GPP TSG RAN WG1 #106b-e, R1-2110218, Oct. 2021.

WIPO, International Search Report and Written Opinion for International Application No. PCT/CN2021/126810, Jul. 15, 2022.

* cited by examiner

CORE NETWORK
DEVICE 900
MEMORY
903
904
PROCESSOR
902
TRANSCEIVER
901

METHOD FOR DATA TRANSMISSION AND DEVICE

CROSS REFERENCE TO RELATED APPLICATION(S)

This application is a continuation of International Application No. PCT/CN2021/126810, filed Oct. 27, 2021, the entire disclosure of which is incorporated herein by reference.

TECHNICAL FIELD

Embodiments of the present disclosure relate to the field of communication technology, and in particular to a method for data transmission and a device.

BACKGROUND

In a new radio (NR) system, a terminal device interacts with an application server or peer device for application layer data, and generally, the application layer data is data that has undergone specific encoding and compression, that is, an application data unit (ADU). How a terminal device transmits or processes the ADU to improve transmission quality is an urgent problem to be solved at present.

SUMMARY

In a first aspect, a method for data transmission is provided in embodiments of the present disclosure. The method includes the following. A terminal device receives first information from a network device, where the first information includes related configurations and/or indications of an application data unit (ADU). The terminal device performs transmission of the ADU according to the first information or stops the transmission of the ADU according to the first information.

In a second aspect, an AN device is provided in embodiments of the present disclosure. The AN device includes a transceiver, a processor, and a memory storing computer-executed instructions. The processor is configured to execute the computer-executed instructions stored in the memory to cause the transceiver to receive second information from a core network (CN) device, wherein the second information indicates related information of an ADU.

In a third aspect, a CN device is provided in embodiments of the present disclosure. The CN device includes a transceiver, a processor, and a memory storing computer-executed instructions. The processor is configured to execute the computer-executed instructions stored in the memory to cause the transceiver to end second information to an AN device, wherein the second information indicates related information of an ADU.

In a fourth aspect, a terminal device is provided in embodiments of the present disclosure. The terminal device includes a transceiver, a processor, and a memory storing computer-executed instructions. The computer-executed instructions stored in the memory, when executed by the processor, cause the processor to perform the method described in the first aspect.

DETAILED DESCRIPTION

Figure 1:
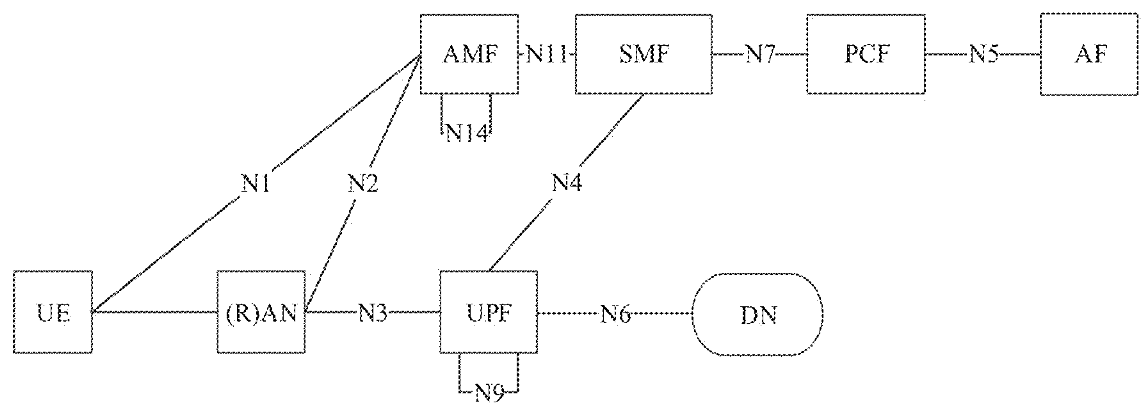
FIG. 1 is a schematic diagram of a network architecture provided in embodiments of the present disclosure.

The following will describe technical solutions of the present disclosure with reference to accompanying drawings.

A method for data transmission provided in the present disclosure may be applicable to various communication systems, for example, a long-term evolution (LTE), an LTE frequency division duplex (FDD) system, an LTE time division duplex (TDD), a universal mobile telecommunication system (UMTS), a worldwide interoperability for microwave access (WiMAX) communication system, a fifth generation mobile communication technology (5G) mobile communication system, or a new radio (NR) access technology. The 5G mobile communication system may include non-standalone (NSA) and/or standalone (SA).

The method for data transmission provided in the present disclosure may also be applicable to a machine-type communication (MTC), a long-term evolution-machine (LTE-M), a device-to-device (D2D) network, a machine-to-machine (M2M) network, an Internet of things (IoT) network, or other networks. The IoT network, for example, may include a vehicle-to-everything (V2X). A communication method of the V2X is generally referred to as vehicle to X (X may represent everything), for example, the V2X may include vehicle-to-vehicle (V2V) communication, vehicle-to-infrastructure (V2I) communication, vehicle-to-pedestrian (V2P) communication, vehicle to network (V2N) communication, or the like.

The method for data transmission provided in the present disclosure may also be applicable to future communication systems, such as a sixth-generation (6G) mobile communication system, which will not be limited in the present disclosure.

In embodiments of the present disclosure, a terminal device may also be referred to as a user device (UE), an access terminal, a user unit, a user station, a mobile station, a mobile station, a mobile platform, a remote station, a remote terminal, a mobile device, a subscriber terminal, a terminal, a wireless communication device, a user agent, or a user device.

The terminal device may be a device that provides voice/data connectivity to a user, for example, a handheld device with wireless communication functions, an in-vehicle device, or the like. Currently, the terminal may be a mobile phone, a pad, a computer with wireless receiving and transmitting functions (e.g., a laptop, a personal digital assistant (PDA), or the like), a mobile Internet device (MID), a virtual reality (VR) device, an augmented reality (AR) device, a wireless terminal in industrial control, a wireless terminal in self-driving, a wireless terminal in remote medical, a wireless terminal in smart grid, a wireless terminal in smart home, a cellular radio telephone, a cordless telephone, a session initiation protocol (SIP) telephone, a wireless local loop (WLL) station, a PDA, a handheld device with wireless communication functions, a computing device, other processing devices coupled with a wireless modem, an in-vehicle device, a wearable device, a terminal device in the 5G network, a terminal device in a future evolved PLMN, or the like.

The wearable device may also be referred to as a wearable smart device, which is a collective name of wearable devices intelligently designed and developed by applying a wearable technology to daily wear, such as glasses, gloves, watches, clothing, shoes, etc. The wearable device is a portable device that can be worn directly on the body or integrated into clothing or accessories of a user. The wearable device not only is a hardware device but also can realize powerful functions through software support, data interaction, and cloud interaction. Broadly speaking, the wearable smart device includes a device that has full functions and large size and can realize all or part of functions without relying on a smart phone, for example, a smart watch, smart glasses, or the like, and includes a device that only focuses on a certain application function and needs to be used with other devices such as a smart phone, e.g., all kinds of smart bracelets and smart jewelry for physical sign monitoring or the like.

In addition, the terminal device may also be a terminal device in an IoT system. The IoT is an important part of the future development of information technology, and main technical characteristics of the IoT is to connect things with the network through communication technology, thus realizing an intelligent network of human-machine interconnection and interconnection of things. IoT technology can achieve mass connectivity, deep coverage, and terminal power saving through, for example, narrow band (NB) technology.

In addition, the terminal device may include sensors such as a smart printer, a train detector, a gas station, etc., whose main functions include collecting data (some of the terminal devices), receiving control information and downlink data from a network device, and sending electromagnetic waves to transmit uplink data to the network device.

In embodiments of the present disclosure, the network device may be any kind of device with wireless receiving and transmitting functions. The network device includes, but is not limited to: an evolved node b (eNB), a radio network controller (RNC), a node b (NB), a base station controller (BSC), a base transceiver station (BTS), a home base station (e.g., a home evolved node b, or home node b, HNB), a base band unit (BBU), an access point (AP), a wireless relay node, transmission point (TP) or transmission and reception point (TRP) in a wireless fidelity (WiFi) system. The network device may also be the 5G such as an NR, a next-generation NodeB (gNB) in a system, a TP, or one or a group (including multiple antenna panels) of antenna panels of a base station in the 5G system. Alternatively, the network device may also be a network node constructing a gNB or a TP, such as a baseband unit (BBU), a distributed unit (DU), or the like.

In some deployments, the gNB may include a centralized unit (CU) and a DU. The gNB also may include an active antenna unit (AAU). The CU achieves a part of functions of the gNB, and the DU achieves a part of functions of the gNB. For example, the CU is responsible for processing non-real-time protocols and services, to achieve functions of a radio resource control (RRC) layer and a packet data convergence protocol (PDCP) layer. The DU is responsible for processing physical-layer protocols and real-time services, to achieve functions of a radio link control (RLC) layer, a media access control (MAC) layer, and a physical (PHY) layer. The AAU achieves a part of processing functions of the PHY layer and related functions of radio frequency (RF) processing and active antennas. Since information of the RRC layer may be finally converted into information of the PHY layer or be obtained by transforming the information of the PHY layer, in this architecture, high-layer signaling, such as RRC-layer signaling, also can be considered as transmitted by the DU or by the DU and the AAU.

It can be understood that the network device may be a device that includes at least one of a CU node, a DU node, or an AAU node. In addition, the CU can be considered as a network device in a radio access network (RAN) or in a core network (CN), which will not be limited herein.

The network device may provide a service for a cell, and the terminal device can communicate with the cell through transmission resources (e.g., frequency-domain resources or spectrum resources) allocated by the network device. The cell may belong to a macro base station (e.g., macro eNB or macro gNB, etc.) or a base station corresponding to a small cell, where the small cell may include a metro cell, a micro cell, a pico cell, a femto cell, or the like. These small cells have features of small coverage ranges and low transmission power and are suitable for providing high-speed data transmission services.

It may be understood that a specific form of the network device or terminal device will not be limited in the present disclosure.

In order to facilitate understanding of embodiments of the present disclosure, a network architecture applicable to embodiments of the present disclosure is firstly described in detail with reference to FIG. 1.

FIG. 1 is a schematic diagram of a network architecture provided in embodiments of the present disclosure. As illustrated in FIG. 1, a 5G network architecture published by a 3rd generation partnership project (3GPP) standards group may include a UE, an AN (including an RAN or AN) supporting 3GPP technology, a user plane function (UPF) network element (NE), an access and mobility management function (AMF) NE, a session management function (SMF) NE, a policy control function (PCF) NE, an application function (AF), and a data network (DN).

It may be understood by those skilled in the art that the 5G network architecture illustrated in FIG. 1 does not constitute a limitation to the 5G network architecture, and when specifically implemented, the 5G network architecture may include more or fewer NEs than illustrated, or a combination of certain NEs, etc. It may be understood that an (R)AN in FIG. 1 represents an AN or RAN.

The UPF NE, the AMF NE, the SMF NE, and the PCF NE illustrated in FIG. 1 are NEs of a 3GPP core network (referred to as core NEs for short). The UPF NE can be referred to as the user plane function NE and is mainly responsible for transmission of user data, and other NEs can be referred to as control plane function NEs and are mainly responsible for identification, authentication, registration management, session management, mobility management, policy control, or the like, so as to ensure reliable and stable transmission of user data.

The UPF NE may be used to forward data to the terminal and receive data from the terminal. For example, the UPF NE may receive service data from the DN and transmit the service data to the terminal through the AN device. The UPF NE may also receive user data from the terminal through the AN device and forward the user data to the DN. Transmission resources allocated and scheduled by the UPF NE for the terminal are managed and controlled by the SMF NE. The bearer between the terminal and the UPF NE may include: a user plane connection between the UPF NE and the AN device, and establishment of a channel between the AN device and the terminal. The user plane connection is a quality of service (QoS) flow for data transmission established between the UPF NE and the AN device.

The AMF NE may be used to manage the access of the terminal to the CN, for example, location update of the terminal, registration to the network, access control, mobility management of the terminal, attachment and de-attachment of the terminal, or the like. In case where the AMF NE provides services for a session of the terminal, the AMF NE may also provide storage resources in the control plane for the session, so as to store a session identifier, an SMF NE identifier associated with the session identifier, or the like.

The SMF NE may be used to select a user plane NE for the terminal, redirect the user plane NE for the terminal, assign an Internet protocol (TP) address to the terminal, establish a bearer (which can also be referred to as a session) between the terminal and the UPF NE, modify and release a session, and control QoS.

The PCF NE is used to provide the AMF NE and the SMF NE with policies such as QoS policies, slice selection policies, or the like.

The AF NE is used to interact with a 3GPP core NE to support influencing data routing by applications, used to access a network exposure function (NEF), and used to interact with the PCF NE for policy control, or the like.

The DN may be an IP multi-media service (IMS) network, the Internet, or the like, for providing data services for a user. The DN may have multiple application servers to provide different application services such as a carrier service, Internet access, a third-party service, or the like, and the AS can realize AFs.

In the future, the support of a 3GPP system for vertical industries will become increasingly extensive and in-depth, for example, ultra-reliable low latency communications (URLLC) business, extended reality (XR) business, or the like.

The following briefly introduces the background of URLLC and XR.

The URLLC supports transmission of factory automation, transport industry, electrical power distribution, or other services in the 5G system.

The XR supports transmission of an AR service, a VR service, and a cloud gaming (CG) service, and a QoS requirement of data transmission need to be met when the UE schedules resources. Therefore, these services have certain requirements for reliability and delay. In addition, power consumption of the UE needs to be considered, so as to avoid unnecessary power consumption. At the same time, considering the problem of accessing of a large number of UEs supporting the above services, the network capacity requirement needs to be ensured during resource allocation.

Typically, the URLLC and the XR need to support a service with a minimum 0.5 ms delay and 99.999% reliability requirement. The service can be pseudo-cyclic. In other words, there is a jitter in a service arrival time, i.e., the service will not arrive at a definite point but will arrive at any moment within a range. Meanwhile, a service cycle may be a non-integer cycle, e.g., 16.67 ms. In addition, arrival times of different service flows for the same service may vary significantly, for example, for the AR service, an uplink (UL) pose has a period of 4 ms, but a UL video has a period of 16.67 ms.

The AR service, the VR service, and the CG service may have service models listed respectively as follows. AR: UL (UL pose information+UL video stream)+downlink (DL) video stream; VR: UL pose information+DL video stream; and CG: UL control information+DL video stream. The above control information or pose information roughly has a period of 4 ms, and a packet size roughly requires 100 bytes. The above video stream roughly has a period of 16.67 ms, and the packet size roughly requires 0.67 Mbps.

Typically, each of the services is a pseudo-cyclic service, i.e., the service arrives in the cycle. However, there is a jitter in the service arrival time at each cycle, i.e., the service arrives within a time range.

Particularly, for the AR service, the UL may include two data streams (i.e., pose information and video information) in a cycle, and these two data streams have different arrival times and different packet sizes.

During data transmission, the UE interacts with an application server or a peer UE for application layer data, and generally, the application layer data is data that has undergone specific encoding and compression, that is, an application data unit (ADU). For example, the ADU may be a frame or a coded slice. For example, encoding and compression are performed using a commonly used H.264 video codec technology standard. According to the H.264 standard, the data is formatted through a network abstraction layer (NAL) and header information for the application layer data is provided. During encoding, a part of the video frame sequence is compressed into frame I, a part of the video frame sequence is compressed into frame P, and a part of the video frame sequence is compressed into frame B. The frame I is a key frame, belongs to an intra-frame compression, and may be decoded only with data of this frame. Both the frame P and the frame B do not have complete picture data, but only data different from pictures of adjacent frames, and may be decoded with pictures of adjacent frames and differences defined by the frame to generate a final picture.

The following briefly introduces an NR MAC packet.

Similar to the LTE system, in an NR system, the network allocates UL transmission resources as per the UE rather than the bearer, and the UE determines which radio bearer data can be put into allocated UL transmission resources for transmission.

Based on the UL transmission resources configured by the network, the UE may need to determine the amount of data to be transmitted for each logical channel (LCH) in initial transmission of a MAC packet data unit (PDU), and in some cases, the UE may also need to allocate resources for a MAC control element (CE). In order to realize multiplexing of UL LCHs, each UL LCH needs to be assigned a priority. For the MAC PDU with a given size, in case where multiple UL LCHs have requirements for data transmission at the same time, MAC PDU resources may be allocated according to an LCH priority corresponding to each UL LCH in a decreasing priority order. At the same time, in order to take account of fairness among different LCHs, a prioritized bit rate (PBR) is introduced, and when the UE multiplexes UL LCHs, a minimum data rate requirement of each LCH needs to be ensured first, thereby avoiding in case where other low priority UP LCHs of the UE are "starved" because higher priority UL LCHs always occupy UL resources allocated to the UE by the network.

To realize the multiplexing of UL LCHs, a network RRC configures the following parameters for each UL LCH. 1) LCH priority: an increasing priority value indicates a lower priority level. 2) PBR: indicates a minimum rate that needs to be ensured for the LCH. 3) bucket size duration (BSD): this parameter determines the depth of a token bucket.

The UE's MAC uses a token bucket mechanism to realize the multiplexing of the UL LCH. The UE maintains a variable Bj for each UL LCH j, and the variable Bj indicates the number of tokens currently available in the token bucket. The method is listed as follows. 1) the UE initializes Bj to 0 when establishing the LCH j. 2) the UE increments Bj by PBR*T before every link control protocol (LCP) procedure, where T is the time elapsed since Bj was last incremented. 3) if the Bj after updating according to 2) is greater than the token bucket size (i.e. PBR*BSD), the Bj is set to the token bucket size.

When the UE receives an UL grant indicating a new transmission, the UE performs a LCH priority processing according to the following operations. Operation 1: for all LCHs with Bj>0, resources are allocated in the decreasing priority order, and resources allocated for each LCH can only meet the requirement of the PBR, i.e., resources are allocated for the LCH according to the number of tokens in the PBR token bucket corresponding to the LCH. When a PBR of an LCH is set to infinity, resources may not be allocated to the lower priority LCH until resources of this LCH are met. Operation 2: decrement Bj by the total size of MAC service data unit (SDU) multiplexed to MAC PDU by LCH j in Operation 1. Operation 3: if UL resources still remain after execution of Operation 1 and Operation 2, remaining resources are allocated to each LCH in the decreasing priority order regardless of the size of the Bj. Only when the data on the higher priority LCH has been sent and the UL grant has not been exhausted, the lower priority LCH can be served. That is, at this time, the UE maximizes data transmission on the higher priority LCH.

At the same time, the UE may also follow the rules below. 1) the UE may not segment an RLC SDU if the whole RLC SDU can fit into the remaining resources. 2) if the UE segments the RLC SDU from the LCH, the UE may fill the largest segments according to the size of the remaining resources. 3) the UE may maximize the transmission of data. 4) if the UL grant size is equal to or larger than 8 bytes while the UE has data for transmission, the UE may not transmit only padding buffer status reporting (BSR) and/or padding.

For different signals and/or LCHs, the UE performs the LCH priority processing while following a priority order below (highest priority listed first): 1) cell-radio network temporary identifier (C-RNTI) MAC CE or data from UL common control channel (UL-CCCH); 2) configured grant confirmation MAC CE; 3) MAC CE for BSR, with exception of BSR included for padding; 4) single entry PHR MAC CE or multiple entry PHR MAC CE; 5) data from any LCH, except data from UL-CCCH; 6) MAC CE for recommended bit rate query; and 7) MAC CE for BSR included for padding.

During data transmission, two ADUs at the application layer may have certain associated relationships with each other. For example, audio data and another video or image data, or a video frame and subtitle corresponding to the video frame need to be played at the same time, thereby meeting a user-side viewing requirement. Another example is that frame B data can be correctly decoded with the arrival of both the frame B and the front and back frames associated with the frame B. If a data frame is successfully transmitted to the UE, but frames associated with the data frame do not arrive, problems such as unsynchronized audio/video playback, decoding failure, or the like may occur, thus having a significant impact on user's experience. For the UE, how to transmit the ADU, especially multiple ADUs with associated relationships, to meet the transmission requirement of the ADU is an urgent problem to be solved.

In response to the above problems, the method for data transmission is proposed in embodiments of the present disclosure. The method mainly includes the following.

For the terminal device, according to related configurations and/or indications of the ADU, the terminal device may perform an ADU-related LCP procedure, an ADU-related packet, or transmission of the ADU, stop the transmission of the ADU, or delete a data packet from the ADU. The ADU may include any ADU, may also include an ADU corresponding to the same LCH/data radio bearer (DRB)/QoS flow, etc., and may also include associated ADUs. The associated ADUs may include at least two ADUs that are associated with each other, and the at least two ADUs are information-related ADUs or ADUs for different types of data streams at the same time. The related configurations of the ADU include a transmission configuration parameter of the ADU. The terminal device may obtain the transmission configuration parameter of the ADU from a network side, may obtain the transmission configuration parameter of the ADU according to predefined information, or may determine the transmission configuration parameter of the ADU by the terminal device. The indications of the ADU include indications from the network side, for example, an indication that the ADU does not meet a configuration requirement, an indication that an requirement of associating ADUs needs to be ensured, an indication that an overall LCH parameter of the associated ADUs needs to be used, or the like.

For the access network (AN) device, after obtaining related information of the ADU, the AN device may generate the related configurations and/or indications of the ADU according to the related information of the ADU, and send the related configurations and/or indications of the ADU to the terminal device, so that the terminal device may perform the ADU-related LCP procedure, the ADU-related packet, or the transmission of the ADU according to the related configurations and/or indications of the ADU, stop the transmission of the ADU according to the related configurations and/or indications of the ADU, or delete a packet of the ADU according to the related configurations and/or indications of the ADU.

For a core network (CN) device, the CN device may obtain the related information of the ADU and may send the related information of the ADU to the AN device, or certainly process the related information of the ADU (e.g., associating the QoS flow, setting the overall transmission requirement of the associated ADUs, or the like) and then send processed related information of the ADU to the AN device. Optionally, the related information of the ADU or the processed related information of the ADU may enable the AN device to perform the related configurations and/or indications of the ADU.

The above solution can improve data transmission quality of the terminal device, especially transmission of the associated ADUs by the terminal device, ensure synchronized processing of the associated ADUs, and realize an overall service transmission requirement of the associated ADUs.

In order to facilitate understanding of embodiments of the present disclosure, several illustrations are given as follows.

In embodiments of the present disclosure, the terms “system” and “network” in this disclosure are often used interchangeably.

The terms “first”, “second”, “third”, “fourth”, or the like in the specification, claims, and the accompanying drawings of the present disclosure are used to distinguish different objects rather than describing a particular order. In addition, the terms “include” and “have” as well as variations thereof are intended to cover non-exclusive inclusion.

The “indication” referred to in embodiments of the present disclosure may be a direct indication, an indirect indication, or an indication indicating an associated relationship. For example, A indicates B, which can mean that A indicates B directly, e.g., B can be obtained through A, can also mean that A indicates B indirectly, e.g., A indicates C, and B can be obtained through C, or can further mean that A and B have an associated relationship.

In embodiments of the present disclosure, the term “corresponding” may represent a direct correspondence or indirect correspondence between the two, may also represent an associated relationship between the two, or may further represent a relation of indicating and being indicated, a relation of configuring and being configured, or other relations.

“Predefine” may be realized by storing a corresponding code, a form, or other means used to indicate related information in advance in a device (e.g., including the terminal device and the network device), and the present disclosure does not limit a specific realization method thereof.

“Pre-configure” may be realized by storing a corresponding code, a form, or other means used to indicate related information in advance in a device (e.g., including the terminal device and the network device), or may be pre-configured through signaling, for example, pre-configured by the network device through signaling, etc., and the present disclosure does not limit a specific realization method thereof.

“Save” may refer to saving in one or more memories. The one or more memories may be separate or integrated in an encoder or a decoder, a processor, or a communication device. The one or more memories may also be partly separately set up and partly integrated in the decoder, the processor, or the communication device. The type of memories may be any form of storage medium, which will not be limited in the present disclosure.

“At least one” refers to one or more, and “a plurality of” or “multiple” refers to two or more. The term “and/or” in this disclosure is simply an illustration of an association relationship of associated objects, indicating that three relationships may exist, for example, A and/or B, which may indicate the existence of A alone, A and B together, and B alone. In addition, the character “/” in this disclosure generally indicates that associated objects are in an “or” relationship. The expression “at least one of” or its equivalent refers to any combination of listed items, including any singular item or any combination of plural items. For example, at least one of a, b, and c may be expressed as: a, b, or c; or a and b, a and c, or b and c; or a, b, and c, where a, b, and c may be single or multiple respectively.

“Protocol” involved in embodiments of the present disclosure may refer to standard protocols in the field of communication, for example, may include an LTE protocol, an NR protocol, and related protocols applied in future communication systems, which will not be limited in the present disclosure.

The following describes technical solutions provided in embodiments of the present disclosure in detail with specific embodiments. It may be noted that the technical solutions provided in embodiments of the present disclosure may include a part of or all of the following content. The following specific embodiments may be combined, and the same or similar concept or process may not be repeated in some embodiments.

Figure 2:
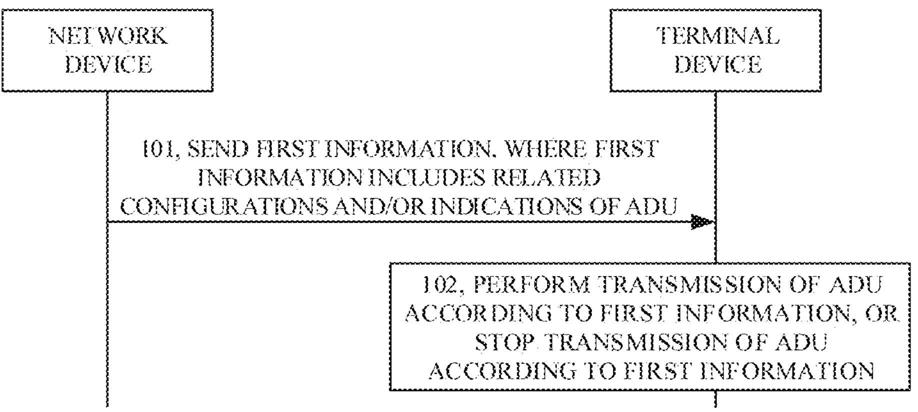
FIG. 2 is a flowchart I of a method for data transmission provided in embodiments of the present disclosure.

FIG. 2 is a flow chart I of a method for data transmission provided in embodiments of the present disclosure. The method for data transmission provided in this embodiment involves interaction between a network device and a terminal device.

As illustrated in FIG. 2, the method for data transmission provided in this embodiment includes the following.

At 101, the network device sends first information to the terminal device, and the first information includes related configurations and/or indications of an ADU.

Optionally, the network device is an AN device, such as a gNB.

The following describes solutions using the network device as the AN device.

Optionally, the first information includes at least one of: a DRB and/or LCH corresponding to the ADU; an LCH parameter corresponding to the ADU; a transmission control parameter of the ADU; or an indication that the ADU does not meet a configuration requirement. The LCH parameter corresponding to the ADU includes an LCH priority, a PBR, or the like. The transmission control parameter of the ADU includes a first-timer parameter of the ADU. The first-timer parameter indicates maximum duration allowed for the transmission of the ADU.

Optionally, the ADU includes one or more ADUs.

Optionally, the ADU includes one or more ADUs corresponding to the same LCH/DRB/QoS flow.

Optionally, the ADU includes associated ADUs, the associated ADUs include at least two ADUs that are associated with each other, and the at least two ADUs are information-related ADUs or ADUs of different types of data streams at the same time.

Optionally, in case where the ADU includes the associated ADUs, the first information includes at least one of: an overall LCH parameter of the associated ADUs; an overall second-timer parameter of the associated ADUs, where the second-timer parameter indicates overall maximum duration allowed for transmission of the associated ADUs; a DRB and/or LCH corresponding to each ADU in the associated ADUs; an LCH parameter corresponding to each ADU in the associated ADUs; a transmission control parameter of each ADU in the associated ADUs; or an indication that the associated ADUs do not meet the configuration requirement. The indication that the associated ADUs do not meet the configuration requirement includes that the associated ADUs overall do not meet the configuration requirement, or that at least one ADU in the associated ADUs does not meet the configuration requirement.

Exemplarily, the associated ADUs include ADU1 and ADU2. One case is that ADU1 and ADU2 belong to different types of data streams, for example, ADU1 is audio data and ADU2 is image data, ADU1 is video data and ADU2 is subtitle data corresponding to the video data, or ADU1 is AR pose data and ADU2 is video or image data. Another case is that ADU1 and ADU2 belong to the same type of data streams, and information of the ADU1 is associated with the information of the ADU2, for example, ADU1 and ADU2 are two image frames before and after an image frame.

Optionally, the AN device indicates that QoS of the associated ADUs of the terminal device does not meet the requirement, or meets maximum tolerable duration of the requirement.

In a possible implementation, the AN device generates the first information according to second information from a CN device, where the second information indicates related information of the ADU.

Optionally, the CN device is an SMF NE.

Optionally, the second information includes at least one of: QoS flow information of the ADU; a transmission requirement of the ADU; an associated indication of the ADU; an associated indication of a QoS flow; an overall transmission requirement of the associated ADUs; or a transmission requirement of each ADU in the associated ADUs. The QoS flow information includes QoS flow identifier (QFI) of the ADU and 5G QoS identifier (5QI) information, and the 5QI information determines QoS attributes. The transmission requirement of the ADU includes the delay, packet delay budget (PDB), reliability, etc. of the ADU. The associated indication of the ADU refers to an indication of at least two ADUs that are associated with each other, for example, an indication that ADU1 is associated with ADU2. The overall transmission requirement of the associated ADUs includes the overall delay, overall PDB, overall reliability, etc. of the associated ADUs.

At 102, the terminal device performs transmission of the ADU according to the first information or stops the transmission of the ADU according to the first information.

In a possible implementation, the terminal device performs the transmission of the ADU according to the first information as follows. The terminal device performs the transmission of the ADU according to the LCH parameter corresponding to the ADU in the first information.

In a possible embodiment, in case where the first information includes related information of the associated ADUs, the terminal device performs the transmission of the ADU according to the first information as follows. The terminal device performs transmission of the associated ADUs according to the first information.

Optionally, the terminal device performs the transmission of the associated ADUs according to the overall LCH parameter of the associated ADUs such as an LCH priority, a PBR, or the like in the first information.

Optionally, the terminal device performs the transmission of the associated ADUs when meeting a first condition, where the first condition includes at least one of. 1) the associated ADUs be received; 2) the associated ADUs starting to be transmitted; 3) the associated ADUs having an available UL grant to transmit; 4) a period allowed by an overall second timer of the associated ADUs; 5) the overall second timer of the associated ADUs timing out; 6) receiving indication information from a network device, where the indication information is used for transmission of the associated ADUs by the terminal device; 7) receiving all ADUs in the associated ADUs (i.e., when all associated ADUs reach the terminal device); or 8) determining presence of the associated ADUs according to a cross-layer interaction or a higher-layer packet header (e.g., service data adaptation protocol (SDAP), PDCP packet headers).

Optionally, when the transmission of the associated ADUs is completed, the terminal device may transmit again by reusing configuration information of the DRB or LCH.

In one possible embodiment, the terminal device stops the transmission of the ADU by at least one of the following. 1) The terminal device stops the transmission of the ADU when the terminal device determines, according to a first-timer parameter of the ADU in the first information, that a first timer times out. 2) The terminal device stops the transmission of the ADU according to the indication that the ADU does not meet the configuration requirement in the first information. That is, the terminal device stops the transmission of the ADU according to an indication from the network side.

In a possible embodiment, in case where the first information includes the related information of the associated ADUs, the terminal device stops the transmission of the ADU according to the first information as follows. The terminal device stops the transmission of the associated ADUs according to the first information. Stopping the transmission of the associated ADUs includes stopping the transmission of all ADUs in the associated ADUs or stopping the transmission of at least one ADU in the associated ADUs.

Optionally, the terminal device turns on the first timer according to at least one of the conditions: when the ADU reaches an access (AS) layer (e.g., a PDCP layer or SDAP layer) of the terminal device; when the ADU starts to be transmitted; or when the ADU has an available UL grant to transmit.

Optionally, the terminal device stopping the transmission of the associated ADUs according to the first information includes at least one of the following.

1) The terminal device stops the transmission of at least one ADU when the terminal device determines, according to a first-timer parameter of the at least one ADU in the associated ADUs in the first information, that a first timer of the at least one ADU times out.

Exemplarily, in case where the associated ADUs include ADU1, ADU2, and ADU3, a UE stops transmission of ADU1, ADU2, and ADU3 when the UE determines that at least one of first timers of the associated ADUs times out.

Exemplarily, in case where the associated ADUs include ADU1, ADU2, and ADU3, the UE stops the transmission of ADU1, ADU2, and ADU3 when the UE determines that at least one of a first timer corresponding to ADU2 or a first timer corresponding to ADU3 times out.

Exemplarily, in case where the associated ADUs include ADU1, ADU2, and ADU3, the UE stops the transmission of ADU2 and ADU3 when the UE determines that both the first timer corresponding to ADU2 or the first timer corresponding to ADU3 time out.

2) The terminal device stops the transmission of at least one ADU according to an indication that the at least one ADU in the associated ADUs does not meet the configuration requirement in the first information.

Exemplarily, in case where the associated ADUs include ADU1, ADU2, and ADU3, the network side indicates that ADU1 of the associated ADUs does not meet the configuration requirement, for example, the network side indicates that ADU1 does not meet the transmission requirement, and the UE stops the transmission of ADU1, the transmission of all AUDs in the associated ADUs, or the transmission of other ADUs, such as ADU2.

3) The terminal device stops the overall transmission of the associated ADUs when the terminal device determines, according to an overall second-timer parameter of the associated ADUs in the first information, that a second timer (e.g., a PDCP discard timer of the associated ADUs) times out.

Exemplarily, in case where the associated ADUs include ADU1, ADU2, and ADU3, the UE stops the transmission of ADU1, ADU2, and ADU3 when the UE determines that the overall second timer of the associated ADUs times out.

4) The terminal device stops the overall transmission of the associated ADUs according to the indication that the associated ADUs overall do not meet the configuration requirement in the first information.

Exemplarily, in case where the associated ADUs include ADU1, ADU2, and ADU3, the network side indicates that the associated ADUs overall do not meet the configuration requirement, for example, the network side indicates that the associated ADUs overall do not meet the transmission requirement thereof, and the UE stops the transmission of ADU1, ADU2, and ADU3.

At 2) described above, the at least one ADU in the associated ADUs not meeting the configuration requirement includes at least one of: the QoS of the at least one ADU not meeting the configuration requirement; transmission duration of the at least one ADU not meeting the configuration requirement; or the LCH parameter of the at least one ADU not meeting the configuration requirement.

At 4) described above, the associated ADUs overall not meeting the configuration requirement includes at least one of: the overall QoS of the associated ADUs not meeting the configuration requirement; the overall transmission duration of the associated ADUs not meeting the configuration requirement; or the overall LCH parameter of the associated ADUs not meeting the configuration requirement.

Optionally, the terminal device turns on the overall second timer of the associated ADUs according to at least one of the conditions: when the associated ADUs reach the AS layer (e.g., the PDCP layer or SDAP layer) of the terminal device, when the associated ADUs start to be transmitted, or when the associated ADUs have an available UL grant to transmit.

Optionally, the PDCP indicates that the MAC uses the overall LCH parameter of the associated ADUs.

Embodiments of the present disclosure illustrate the method for data transmission. The terminal device performs the transmission of the ADU according to the first information from the AN device or stops the transmission of the ADU according to the first information from the AN device, where the first information includes the related configurations and/or indications of the ADU. When the first information includes the related configurations and/or indications of the associated ADUs, the terminal device may perform the transmission of the associated ADUs according to the first information or stop the transmission of the associated ADUs according to the first information. The above solution may improve data transmission quality of the terminal device, especially the transmission of the associated ADUs, ensure synchronized processing of the associated ADUs, and realize an overall service transmission requirement of the associated ADUs.

It may be noted that, in the above embodiment, when the associated ADUs all reach the AS layer of the terminal device, the overall LCH parameter of the associated ADUs is used for the transmission of the associated ADUs (i.e., an overall LCP or MAC PDU packet of the associated ADUs), thereby ensuring the synchronized processing of the associated ADUs and realizing the overall service transmission requirement of the associated ADUs, which is particularly applicable to a case where multiple different services are mapped to one DRB or LCH.

Optionally, in some embodiments, the terminal device performs the transmission of the ADU according to a predefined LCH parameter or an LCH parameter determined by the terminal device. Optionally, the predefined LCH parameter or the LCH parameter determined by the terminal device includes an LCH parameter of an LCH or DRB corresponding to the ADU.

Optionally, in some embodiments, the terminal device performs the transmission of the associated ADUs according to the predefined LCH parameter or the LCH parameter determined by the terminal device. Optionally, the predefined LCH parameter or the LCH parameter determined by the terminal device includes at least one of: an LCH parameter of an LCH or DRB corresponding to each ADU in the associated ADUs; the LCH priority in the overall LCH parameter of the associated ADUs; the PBR in the overall LCH parameter of the associated ADUs; or the number or size of associated ADUs that the PBR is capable of carrying.

Exemplarily, the terminal device sets the LCH parameter of the LCHs or DRBs corresponding to the associated ADUs to be the highest priority, the PBR to be infinite, or the PBR to be able to carry the size of the associated ADUs; the terminal device sets all the LCH parameters of the LCHs or DRBs corresponding to the associated ADUs to be a value of the priority with the highest LCH priority in the LCHs corresponding to the associated ADUs; or the terminal device sets the priority and/or LCH parameter of the LCH or DRB with the highest priority in the LCHs or DRBs corresponding to the ADU to the parameter of the associated ADUs.

Optionally, in some embodiments, in case where the terminal device stops the transmission of the ADU, the terminal device may further perform operations as follow. The terminal device deletes a data packet of the ADU.

Optionally, the terminal device deleting the data packet of the ADU includes at least one of: 1) deleting, at the PDCP layer of the terminal device, a data packet of the ADU in the PDCP layer; 2) deleting, at an RLC layer of the terminal device, a data packet of the ADU in the RLC layer; or 3) deleting, at a MAC layer of the terminal device, a data packet of the ADU in the MAC layer.

Optionally, the data packet of the ADU includes at least one of: 1) a data packet, which does not meet the configuration requirement and is not transmitted, in an LCH/DRB/flow where the ADU is located; 2) a data packet, which does not meet the configuration requirement and is not transmitted successfully, in the LCH/DRB/flow where the ADU is located; 3) a data packet, which does not meet the configuration requirement and for which an acknowledgement (ACK) feedback is not received, in the LCH/DRB/flow where the ADU is located; or 4) all data packets received by the terminal device (e.g., the PDCP layer/RLC layer/MAC layer of the terminal device) corresponding to the ADU.

Optionally, in some embodiments, in case where the terminal device stops the transmission of the associated ADUs, the terminal device may further perform operations as follows. The terminal device deletes a data packet of the associated ADUs, where the associated ADUs include an ADU in multiple LCHs/DRBs/QoS flows corresponding to the associated ADUs.

Optionally, the terminal device deleting the data packet of the associated ADUs includes at least one of: 1) deleting, at the PDCP layer of the terminal device, a data packet of the associated ADUs in the PDCP layer; 2) deleting, at the RLC layer of the terminal device, a data packet of the associated ADUs in the RLC layer; or 3) deleting, at the MAC layer of the terminal device, a data packet of the associated ADUs in the MAC layer.

Optionally, the data packet of the associated ADUs includes at least one of: a data packet, which is not transmitted, of at least one ADU that does not meet the configuration requirement in the associated ADUs; a data packet, which is not transmitted, of all ADUs in the associated ADUs; a data packet, which is not transmitted successfully, of the at least one ADU that does not meet the configuration requirement in the associated ADUs; a data packet, which is not transmitted successfully, of all ADUs in the associated ADUs; a data packet, for which an ACK feedback is not received, of the least one ADU that does not meet the configuration requirement in the associated ADUs; a data packet, for which the ACK feedback is not received, in the associated ADUs; or all data packets corresponding to the associated ADUs.

Optionally, when the terminal device determines that the second timer times out, the terminal device deletes the data packet not transmitted of the associated ADUs, or deletes a data packet not transmitted of the associated ADUs in multiple LCHs/DRBs/QoS flows corresponding to the associated ADUs.

Optionally, when the terminal device determines that the second timer times out, the terminal device deletes all associated ADUs in associated LCHs/DRBs, for example, the terminal device deletes an ADU carrying an associated identifier or carrying the same associated identifier (e.g., with the same associated sequence number (SN)).

Optionally, the AN device indicates that overall QoS of the associated ADUs do not meet the requirement, or meets the maximum tolerable duration of the requirement.

Optionally, according to the indication information of the AN device, that is, the overall QoS of the associated ADUs do not meet the requirement, or the associated ADUs or multiple LCHs/DRBs/QoS flows corresponding to the associated ADUs do not meet the requirement within the maximum tolerable duration, the terminal device deletes the packet not transmitted of the associated ADUs, or deletes the data packet not transmitted of the associated ADUs in multiple LCHs/DRBs/QoS flows corresponding to the associated ADUs.

The above solution of deleting packet of the associated ADUs is mainly to delete the packet of the associated ADUs when the associated ADUs cannot realize the transmission requirement, thereby avoiding a reduction in transmission performance of other associated ADUs due to unnecessary transmission, and realizing an overall service transmission requirement of the associated ADUs.

Figure 3:
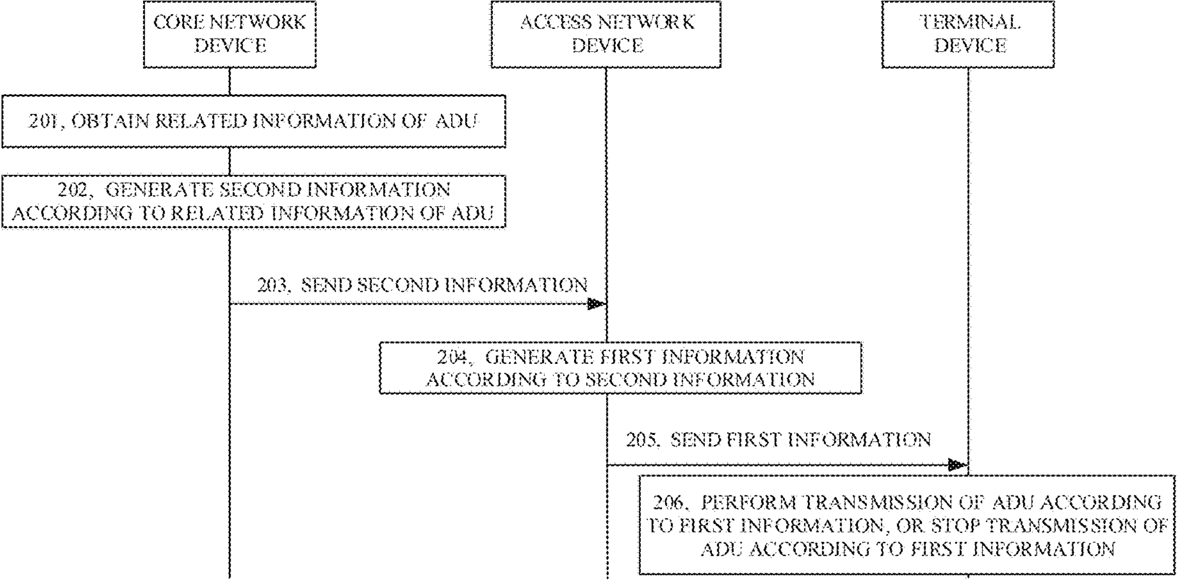
FIG. 3 is a flowchart II of a method for data transmission provided in embodiments of the present disclosure.

FIG. 3 is a flowchart II of a method for data transmission provided in embodiments of the present disclosure. The method for data transmission provided in this embodiment involves interaction between a CN device, an AN device, and a terminal device. As illustrated in FIG. 3, the method for data transmission provided in this embodiment includes the following.

At 201, the CN device obtains related information of an ADU.

Optionally, the related information of the ADU contains at least one of: data stream information of the ADU; QoS flow information of the ADU; a transmission requirement of the ADU; an associated indication of the ADU; an associated indication of a QoS flow; or an associated indication of a DRB or RLC. It can be understood that the related information of the ADU includes related information of a separate ADU such as the QoS flow information, the transmission requirement of the ADU, or the like; or includes related information of associated ADUs, e.g., an associated indication of the association, indication of the QoS flow/DRB/RLC of the associated ADUs, or the like.

The data stream information of the ADU includes information such as a Quasi Co-Location (QCI), an IP 5-tuple, or the like. IP 5-tuple information contains a source IP address, a source port, a destination IP address, a destination port, and a transport layer protocol (TLP). The QoS flow information of the ADU includes a 5QI, a QoS flow transmission parameter, or the like. The transmission requirement of the ADU includes delay, a PDB, reliability, or the like. The associated indication of the ADU refers to an indication of at least two ADUs that are associated with each other, such as an indication that ADU1 is associated with ADU2. The associated indication of the QoS flow refers to an indication of at least two QoS flows that are associated with each other. The associated indication of the DRB refers to an indication of at least two DRBs that are associated with each other. The associated indication of the RLC refers to an indication of at least two RLCs that are associated with each other.

Optionally, the CN device is an SMF NE.

In a possible embodiment, the core network device obtaining the related information of the ADU includes the following. The SMF NE obtains the related information of the ADU from a PCF NE and/or an AF NE.

Optionally, the same QoS flow can include only one service or include multiple services.

At 202, the CN device generates second information according to the related information of the ADU.

Optionally, the second information includes at least one of: the QoS flow information of the ADU; the transmission requirement of the ADU; the associated indication of the ADU; the associated indication of the QoS flow; an overall transmission requirement of the associated ADUs; or a transmission requirement of each ADU in the associated ADUs. Each item of information in the second information can be referred to the above embodiments and will not be repeated herein.

Optionally, the CN device maps at least two ADUs that are associated with each other to different QoS flows corresponding to different QFIs.

Optionally, the CN device determines the overall transmission requirement of the associated ADUs according to the transmission requirement of each ADU in the associated ADUs.

At 203, the CN device sends the second information to the AN device.

At 204, the AN device generates first information according to the second information.

Optionally, in case where the at least two ADUs that are associated with each other correspond to different QoS flows, the AN device maps each ADU, that is, the QoS flow corresponding to each ADU, to different DRBs or LCHs. Further, the AN device indicates which DRBs or LCHs are associated with each other.

Optionally, in case where the at least two ADUs in the associated ADUs are mapped to different DRBs or LCHs, different LCH parameters such as an LCH priority and a PBR are configured for the different DRBs or LCHs.

Optionally, as for the overall LCH parameter of the associated ADUs such as the LCH priority and the PBR, for example, the overall LCH parameter for the associated ADUs is an LCH parameter used by the terminal device when a first condition is met.

Optionally, the AN device configures a transmission control parameter of the associated ADUs, such as a second-timer parameter, according to the overall transmission requirement of the associated ADUs, and the second-timer parameter indicates overall maximum duration allowed for the transmission of the associated ADUs.

At 205, the AN device sends first information to the terminal device.

At 206, the terminal device performs the transmission of the ADU according to the first information or stops the transmission of the ADU according to the first information.

Operations at 205 and 206 of this embodiment correspond to operations at 101 and 102 of the above embodiment, respectively, which can be referred to the above embodiment and will not be repeated herein.

The method for data transmission illustrated in this embodiment mainly describes the interaction between the CN device and the AN device and the device configuration process. The CN device sends the second information to the AN device indicating the related information of the ADU. The AN device generates the first information according to the second information, and the first information includes the related configurations of and/or indications of the ADU, such that the terminal device can perform the transmission of the ADU, stop the transmission of the ADU, or delete related data packet of the ADU, according to the first information. When the first information includes the related configurations and/or indications of the associated ADUs, the terminal device may perform the transmission of the associated ADUs according to the first information or stop the transmission of the associated ADUs according to the first information. The above solution may improve data transmission quality of the terminal device, especially the transmission of the associated ADUs, ensure synchronized processing of the associated ADUs, and realize an overall service transmission requirement of the associated ADUs.

The method for data transmission provided in embodiments of the present disclosure is described in detail above, and the terminal device, the AN device, and the CN device provided in embodiments of the present disclosure are described below.

Figure 4:
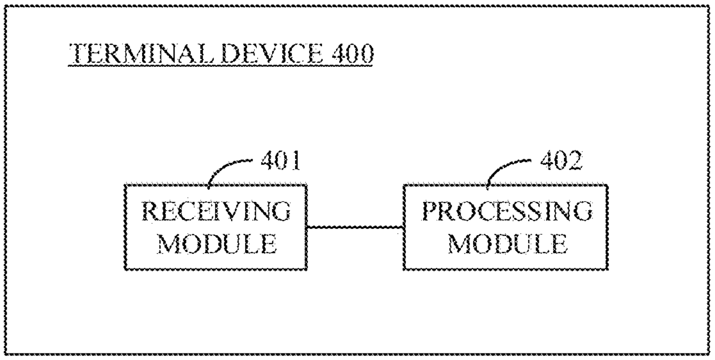
FIG. 4 is a schematic structural diagram of a terminal device provided in embodiments of the present disclosure.

FIG. 4 is a schematic structural diagram of a terminal device provided in embodiments of the present disclosure. As illustrated in FIG. 4, a terminal device 400 provided in this embodiment includes a receiving module 401 and a processing module 402. The receiving module 401 is configured to receive first information from a network device, where the first information includes related configurations and/or indications of an ADU. The processing module 402 is configured to perform transmission of the ADU according to the first information or stop the transmission of the ADU according to the first information.

Optionally, the first information includes at least one of: a DRB and/or LCH corresponding to the ADU; an LCH parameter corresponding to the ADU; a transmission control parameter of the ADU; or an indication that the ADU does not meet a configuration requirement.

Optionally, the transmission control parameter of the ADU includes a first-timer parameter of the ADU, and the first-timer parameter indicates maximum duration allowed for the transmission of the ADU.

In an optional embodiment of the present disclosure, the processing module 402 is configured to perform the transmission of the ADU according to the LCH parameter corresponding to the ADU in the first information.

In an optional embodiment of the present disclosure, the processing module 402 is configured to perform at least one of: stopping the transmission of the ADU when the processing module 402 determines, according to the first-timer parameter of the ADU in the first information, that a first timer times out; or stopping the transmission of the ADU according to the indication that the ADU does not meet the configuration requirement in the first information.

In an optional embodiment of the present disclosure, the processing module 402 is configured to perform the transmission of the ADU according to a predefined LCH parameter or an LCH parameter determined by the terminal device.

Optionally, the predefined LCH parameter or the LCH parameter determined by the terminal device includes an LCH parameter of an LCH or DRB corresponding to the ADU.

In an optional embodiment of the present disclosure, in case where the processing module 402 stops the transmission of the ADU, the processing module 402 is further configured to delete a data packet of the ADU.

In an optional embodiment of the present disclosure, the processing module 402 configured to delete the data packet of the ADU includes at least one of: deleting, at a PDCP layer of the terminal device, a data packet of the ADU in the PDCP layer; deleting, at an RLC layer of the terminal device, a data packet of the ADU in the RLC layer; or deleting, at a MAC layer of the terminal device, a data packet of the ADU in the MAC layer.

Optionally, the data packet of the ADU includes at least one of: a data packet, which does not meet a configuration requirement and is not transmitted, in an LCH/DRB/flow where the ADU is located; a data packet, which does not meet the configuration requirement and is not transmitted successfully, in the LCH/DRB/flow where the ADU is located; a data packet, which does not meet the configuration requirement and for which an ACK feedback is not received, in the LCH/DRB/flow where the ADU is located; or all data packets received by the terminal device corresponding to the ADU.

In an optional embodiment of the present disclosure, the processing module 402 is configured to turn on the first timer when the ADU reaches an AS layer of the terminal device, the ADU starts to be transmitted, or the ADU has an available UL grant to transmit.

Optionally, the ADU includes associated ADUs, the associated ADUs include at least two ADUs that are associated with each other, and the at least two ADUs are information-related ADUs or ADUs of different types of data streams at the same time.

Optionally, the first information includes at least one of: an overall LCH parameter of the associated ADUs; an overall second-timer parameter of the associated ADUs, where the second-timer parameter indicates overall maximum duration allowed for transmission of the associated ADUs; a DRB and/or LCH corresponding to each ADU in the associated ADUs; an LCH parameter corresponding to each ADU in the associated ADUs; a transmission control parameter of each ADU in the associated ADUs; or an indication that the associated ADUs do not meet the configuration requirement.

In an optional embodiment of the present disclosure, the processing module 402 is configured to perform the transmission of the associated ADUs according to the overall LCH parameter of the associated ADUs in the first information.

In an optional embodiment of the present disclosure, the processing module 402 is configured to perform the transmission of the associated ADUs according to a predefined LCH parameter or an LCH parameter determined by the terminal device.

Optionally, the predefined LCH parameter or the LCH parameter determined by the terminal device includes at least one of: an LCH parameter of the LCH or DRB corresponding to each ADU in the associated ADUs; an LCH priority in the overall LCH parameter of the associated ADUs; a PBR in the overall LCH parameter of the associated ADUs; or the number or size of the associated ADUs that the PBR is capable of carrying.

In an optional embodiment of the present disclosure, the processing module 402 is configured to perform the transmission of the associated ADUs when the processing module 402 meets a first condition, where the first condition includes at least one of: the associated ADUs be received; the associated ADUs starting to be transmitted; the associated ADUs having an available UL grant to transmit; a period allowed by an overall second timer of the associated ADUs; the overall second timer of the associated ADUs timing out; receiving indication information from the network device, where the indication information indicates that the terminal device performs the transmission of the associated ADUs; receiving all ADUs in the associated ADUs; or determining presence of the associated ADUs according to a cross-layer interaction or a higher-layer packet header.

In an optional embodiment of the present disclosure, the processing module 402 configured to stop the transmission of the ADU according to the first information includes at least one of: stopping the transmission of at least one ADU when the processing module 402 determines, according to a first-timer parameter of the at least one ADU in the associated ADUs in the first information, that a first timer of the at least one ADU times out; stopping the transmission of at least one ADU according to an indication that the at least one ADU in the associated ADUs do not meet the configuration requirement in the first information; stopping the overall transmission of the associated ADUs when the processing module 402 determines, according to the overall second-timer parameter of the associated ADUs in the first information, that a second timer times out; and stopping the overall transmission of the associated ADUs according to the indication that the associated ADUs overall do not meet the configuration requirement in the first information.

Optionally, the associated ADUs overall not meeting the configuration requirement includes at least one of: an overall QoS of the associated ADUs not meeting the configuration requirement; overall transmission duration of the associated ADUs not meeting the configuration requirement; or the overall LCH parameter of the associated ADUs not meeting the configuration requirement.

In an optional embodiment of the present disclosure, the processing module 402 is configured to stop the transmission of the associated ADUs; and accordingly, the processing module 402 is further configured to delete a data packet of the associated ADUs.

In an optional embodiment of the present disclosure, the processing module 402 configured to delete the data packet of the associated ADUs includes at least one of: deleting, at the PDCP layer of the terminal device, a data packet of the associated ADUs in the PDCP layer; deleting, at the RLC layer of the terminal device, a data packet of the associated ADUs in the RLC layer; or deleting, at the MAC layer of the terminal device, a data packet of the associated ADUs in the MAC layer.

Optionally, the data packet of the associated ADUs includes at least one of: a data packet, which is not transmitted, of at least one ADU that does not meet the configuration requirement in the associated ADUs; a data packet, which is not transmitted, of all ADUs in the associated ADUs; a data packet, which is not transmitted successfully, of the at least one ADU that does not meet the configuration requirement in the associated ADUs; a data packet, which is not transmitted successfully, of all ADUs in the associated ADUs; a data packet, for which an ACK feedback is not received, of the least one ADU that does not meet the configuration requirement in the associated ADUs; a data packet, for which the ACK feedback is not received, in the associated ADUs; and all data packets corresponding to the associated ADUs.

In an optional embodiment of the present disclosure, the processing module 402 is configured to turn on the second timer when the associated ADUs reach an AS of the terminal device, the associated ADUs start to be transmitted, or the associated ADUs have an available UL grant to transmit.

The terminal device provided in this embodiment of the present disclosure can perform the technical solutions of the terminal device in the above method embodiments, and the realization principle and technical effect are similar to those in the above method embodiments, which will not be repeated herein.

Figure 5:
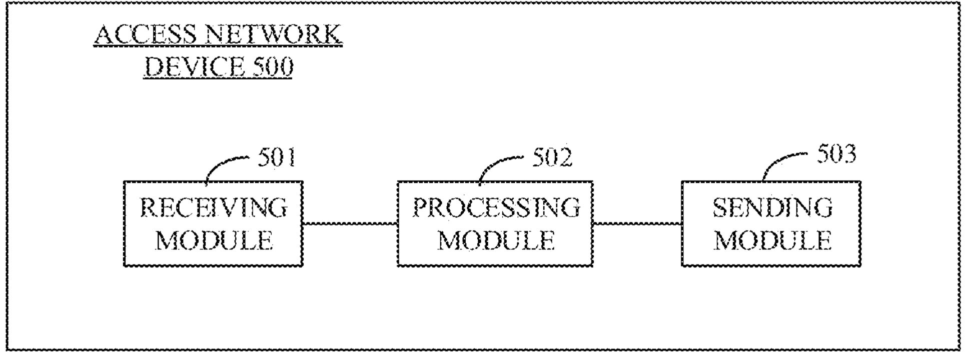
FIG. 5 is a schematic structural diagram of an access network (AN) device provided in embodiments of the present disclosure.

FIG. 5 is a schematic structural diagram of an AN device provided in embodiments of the present disclosure. As illustrated in FIG. 5, an AN device 500 provided in this embodiment includes a receiving module 501, a processing module 502, and a sending module 503. The receiving module 501 is configured to receive second information from a CN device, where the second information indicates related information of an ADU.

Optionally, the second information includes at least one of: QoS flow information of the ADU; a transmission requirement of the ADU; an associated indication of the ADU; an associated indication of a QoS flow; an overall transmission requirement of associated ADUs; and a transmission requirement of each ADU in the associated ADUs.

Optionally, the associated ADUs include at least two ADUs that are associated with each other, and the at least two ADUs are information-related ADUs or ADUs of different types of data streams at the same time.

In an optional embodiment of the present disclosure, the processing module 502 is configured to generate first information according to the second information; and/or the sending module 503 is configured to send the first information to a terminal device.

Optionally, the first information includes at least one of: a DRB and/or LCH corresponding to the ADU; an LCH parameter corresponding to the ADU; a transmission control parameter of the ADU; or an indication that the ADU does not meet a configuration requirement.

Optionally, the transmission control parameter of the ADU includes a first-timer parameter of the ADU, and the first-timer parameter indicates maximum duration allowed for transmission of the ADU.

Optionally, the first information includes at least one of: an overall LCH parameter of the associated ADUs; an overall second-timer parameter of the associated ADUs, where the second-timer parameter indicates overall maximum duration allowed for transmission of the associated ADUs; a DRB and/or LCH corresponding to each ADU in the associated ADUs; an LCH parameter corresponding to each ADU in the associated ADUs; a transmission control parameter of each ADU in the associated ADUs; or an indication that the associated ADUs do not meet the configuration requirement.

Optionally, the CN device is an SMF NE.

The AN device provided in this embodiment of the present disclosure can perform the technical solutions of the AN device in the above method embodiments, and the realization principle and technical effect are similar to those in the above method embodiments, which will not be repeated herein.

Figure 6:
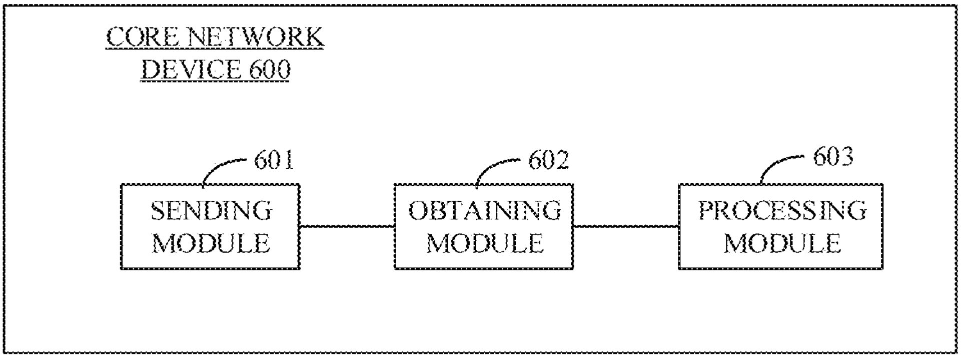
FIG. 6 is a schematic structural diagram of a core network (CN) device provided in embodiments of the present disclosure.

FIG. 6 is a schematic structural diagram of a CN device provided in embodiments of the present disclosure. As illustrated in FIG. 6, a CN device 600 provided in this embodiment includes a sending module 601, an obtaining module 602, and a processing module 603. The sending module 601 is configured to send second information to an AN device, where the second information indicates related information of an ADU.

In an optional embodiment of the present disclosure, the obtaining module 602 is configured to obtain the related information of the ADU; and/or the processing module 603 is configured to generate the second information according to the related information of the ADU. The second information includes at least one of. QoS flow information of the ADU; a transmission requirement of the ADU; an associated indication of the ADU; an associated indication of a QoS flow; an overall transmission requirement of associated ADUs; or a transmission requirement of each ADU in the associated ADUs.

Optionally, the associated ADUs include at least two ADUs that are associated with each other, and the at least two ADUs are information-related ADUs or ADUs of different types of data streams at the same time.

Optionally, the related information of the ADU includes at least one of: data stream information of the ADU; QoS flow information of the ADU; the transmission requirement of the ADU; the associated indication of the ADU; the associated indication of a QoS flow; or an associated indication of a DRB or RLC.

Optionally, the CN device is an SMF NE.

In an optional embodiment of the present disclosure, the CN device is the SMF NE, and an obtaining module 602 of the SMF NE is configured to obtain the related information of the ADU from a PCF NE and/or an AF NE.

The CN device provided in this embodiment of the present disclosure can perform the technical solutions of the CN device in the above method embodiments, and the realization principle and technical effect are similar to those in the above method embodiments, which will not be repeated herein.

Figure 7:
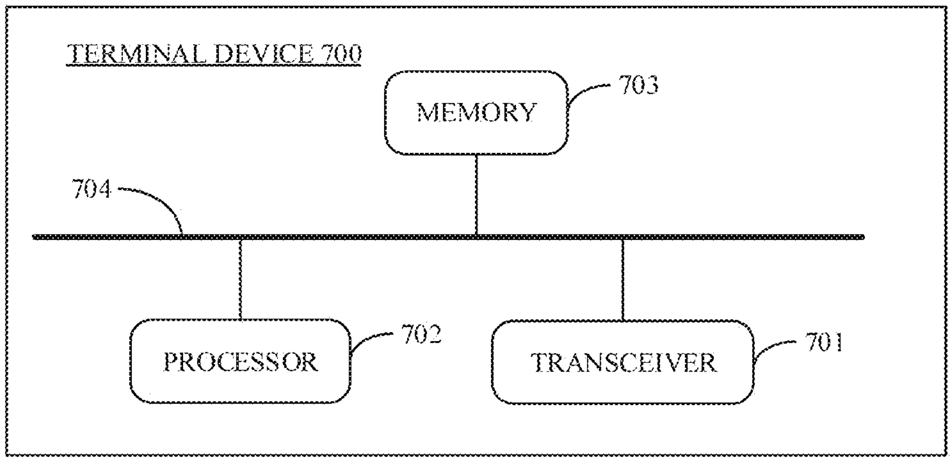
FIG. 7 is a schematic diagram of a hardware structure of a terminal device provided in embodiments of the present disclosure.

FIG. 7 is a schematic diagram of a hardware structure of a terminal device provided in embodiments of the present disclosure. As illustrated in FIG. 7, a terminal device 700 provided in this embodiment may include a transceiver 701, a processor 702, and a memory 703. The memory 703 stores computer-executed instructions. The computer-executed instructions stored in the memory 703, when executed by the processor 702, cause the processor 702 to perform the technical solutions of the terminal device described in any one of the above method embodiments.

Optionally, the memory 703 can be either independent of or integrated with the processor 702. When the memory 703 is independent of the processor 702, the terminal device 700 may further include a bus 704 for connecting the memory 703 and the processor 702. Optionally, the processor 702 may be a chip.

Figures 8, 9:
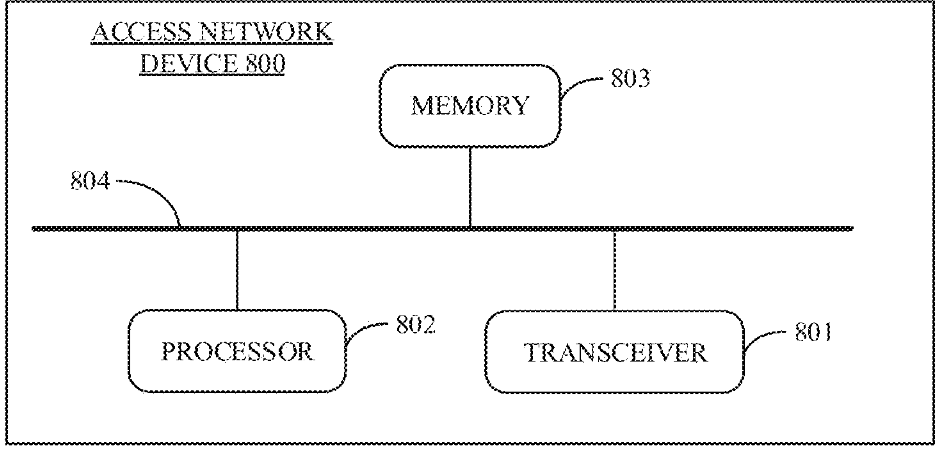
FIG. 8 is a schematic diagram of a hardware structure of an AN device provided in embodiments of the present disclosure.
FIG. 9 is a schematic diagram of a hardware structure of a CN device provided in embodiments of the present disclosure.

FIG. 8 is a schematic diagram of a hardware structure of an AN device provided in embodiments of the present disclosure. As illustrated in FIG. 8, an AN device 800 provided in this embodiment may include a transceiver 801, a processor 802, and a memory 803. The memory 803 stores computer-executed instructions. The computer-executed instructions stored in the memory 803, when executed by the processor 802, cause the processor 802 to perform the technical solutions of the AN device described in any one of the above method embodiments.

Optionally, the memory 803 can be either independent of or integrated with the processor 802. When the memory 803 is independent of the processor 802, the AN device 800 may further include a bus 804 for connecting the memory 803 and the processor 802. Optionally, the processor 802 may be a chip.

FIG. 9 is a schematic view of a hardware structure of an CN device provided in embodiments of the present disclosure. As illustrated in FIG. 9, an CN device 900 provided in this embodiment may include a transceiver 901, a processor 902, and a memory 903. The memory 903 stores computer-executed instructions. The computer-executed instructions stored in the memory 903, when executed by the processor 902, cause the processor 902 to perform the technical solutions of the CN device described in any one of the above method embodiments.

Optionally, the memory 903 can be either independent of or integrated with the processor 902. When the memory 903 is independent of the processor 902, the CN device 900 may further include a bus 904 for connecting the memory 903 and the processor 902. Optionally, the processor 902 may be a chip.

It may be understood that the chip described above may be a field programmable gate array (FPGA), an application-specific integrated circuit (ASIC), a system on chip (SoC), a central processor unit (CPU), a network processor (NP), a digital signal processor (DSP), a microcontroller unit (MCU), a programmable logic device (PLD), or other integrated chips.

During embodiment, each step of the above method may be completed by an integrated logic circuit in the form of hardware or an instruction in the form of software in the processor. The steps of the method disclosed in embodiments of the present disclosure may be directly implemented as a hardware decoding processor, or may be performed by hardware and software modules in the decoding processor. The software module can be located in a storage medium such as a random access memory (RAM), a flash memory, a read-only memory (ROM), a programmable ROM (PROM), or an electrically erasable programmable memory, registers, or the like. The storage medium is located in the memory. The processor reads the information in the memory, and completes the steps of the above method with the hardware thereof, which will not be repeated herein for the sake of simplicity.

It may be noted that the processor in embodiments of the present disclosure may be an integrated circuit chip with signal processing capabilities. During embodiment, each step of the above method embodiments may be completed by an integrated logic circuit in the form of hardware or an instruction in the form of software in the processor. The processor may be a general-purpose processor, a DSP, an ASIC, an FPGA, or other programmable logic devices, a discrete gate or transistor logic device, or a discrete hardware component. The processor may implement or perform the methods, steps, and logic blocks disclosed in embodiments of the present disclosure. The general-purpose processor may be a microprocessor, any conventional processor, or the like. The steps of the method disclosed in embodiments of the present disclosure may be directly implemented as a hardware decoding processor, or may be performed by hardware and software modules in the decoding processor. The software module can be located in a storage medium such as a random access memory (RAM), a flash memory, an ROM, a programmable ROM (PROM), or an electrically erasable programmable memory, registers, or the like. The storage medium is located in the memory.

The processor reads the information in the memory, and completes the steps of the above method with the hardware thereof.

It will be appreciated that the memory in embodiments of the present disclosure may be volatile memory or non-volatile memory, or may include both volatile and non-volatile memory. Among other things, the non-volatile memory may be a ROM, a PROM, an erasable PROM (EPROM), an electrically EPROM (EEPROM), or a flash memory. The volatile memory may be a RAM used as an external cache. By way of example, but not limitation, many forms of the RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SL-DRAM), and a direct rambus RAM (DR RAM). It may be noted that the memory of the systems and methods described herein is intended to include, but is not limited to, these and any other suitable types of memory.

According to the method provided in embodiments of the present disclosure, a computer-readable storage medium is further provided in the present disclosure. The computer-readable storage medium stores computer-executed instructions which, when executed by the processor, cause the processor to perform technical solutions of the terminal device in the above method embodiments.

According to the method provided in embodiments of the present disclosure, a computer program is further provided in the present disclosure. The computer program, when executed by the processor, causes the processor to perform technical solutions of the terminal device in the above method embodiments.

According to the method provided in embodiments of the present disclosure, a computer program product is further provided in the present disclosure. The computer program product includes program instructions that are used to perform technical solutions of the terminal device in the above method embodiments.

According to the method provided in embodiments of the present disclosure, a chip is further provided in the present disclosure. The chip includes a processing module and a communication interface. The processing module may perform the technical solutions of the terminal device in the above method embodiments. Further, the chip further includes a storage module (e.g., a memory). The storage module is configured to store instructions, the processing module is configured to execute the instructions stored in the storage module, and execution of the instructions stored in the storage module causes the processing module to perform technical solutions of the terminal device in the above method embodiments.

According to the method provided in embodiments of the present disclosure, a computer-readable storage medium is further provided in the present disclosure. The computer-readable storage medium stores computer-executed instructions which, when executed by the processor, cause the processor to perform technical solutions of the AN device in the above method embodiments.

According to the method provided in embodiments of the present disclosure, a computer program is further provided in the present disclosure. The computer program, when executed by the processor, causes the processor to perform technical solutions of the AN device in the above method embodiments.

According to the method provided in embodiments of the present disclosure, a computer program product is further provided in the present disclosure. The computer program product includes program instructions that are used to perform technical solutions of the AN device in the above method embodiments.

According to the method provided in embodiments of the present disclosure, a chip is further provided in the present disclosure. The chip includes a processing module and a communication interface. The processing module may perform the technical solutions of the AN device in the above method embodiments. Further, the chip further includes a storage module (e.g., a memory). The storage module is configured to store instructions, the processing module is configured to execute the instructions stored in the storage module, and execution of the instructions stored in the storage module causes the processing module to perform technical solutions of the AN device in the above method embodiments.

According to the method provided in embodiments of the present disclosure, a computer-readable storage medium is further provided in the present disclosure. The computer-readable storage medium stores computer-executed instructions which, when executed by the processor, cause the processor to perform technical solutions of the CN device in the above method embodiments.

According to the method provided in embodiments of the present disclosure, a computer program is further provided in the present disclosure. The computer program, when executed by the processor, causes the processor to perform technical solutions of the CN device in the above method embodiments.

According to the method provided in embodiments of the present disclosure, a computer program product is further provided in the present disclosure. The computer program product includes program instructions that are used to perform technical solutions of the CN device in the above method embodiments.

According to the method provided in embodiments of the present disclosure, a chip is further provided in the present disclosure. The chip includes a processing module and a communication interface. The processing module may perform the technical solutions of the CN device in the above method embodiments. Further, the chip further includes a storage module (e.g., a memory). The storage module is configured to store instructions, the processing module is configured to execute the instructions stored in the storage module, and execution of the instructions stored in the storage module causes the processing module to perform technical solutions of the CN device in the above method embodiments.

According to the method provided in embodiments of the present disclosure, a communication system is further provided in the present disclosure. The communication system may include a terminal device, an AN device, and a CN device described above.

The terms "component", "module", "system", or the like, as used in this specification, represent a computer-related entity, hardware, firmware, a combination of hardware and software, software, or software in execution. For example, a component may be, but is not limited to, a process running on a processor, a processor, an object, an executable file, a thread of execution, a program, and/or a computer. By way of illustration, a computing device and an application running on the computing device may both be components. One or more components may be resident in the process and/or the thread of execution, and the components may be localized on one computer and/or distributed between two or more computers. Furthermore, these components may be executed from various computer-readable media having various data structures stored thereon. The components may communicate, for example, through local and/or remote processes according to signals having one or more data packets (e.g., data from two components interacting with a local system, a distributed system, and/or another component between networks, such as the Internet interacting with other systems via signals).

Those of ordinary skill in the art will appreciate that units and algorithmic operations of various examples described in connection with embodiments herein can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and simplicity, in terms of the working processes of the foregoing systems, apparatuses, and units, reference can be made to the corresponding processes of the above method embodiments, which will not be repeated herein.

It will be appreciated that the systems, apparatuses, and methods disclosed in embodiments herein may also be implemented in various other manners. For example, the above apparatus embodiments are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device, or unit, and may be electrical, mechanical, or otherwise.

Separated units as illustrated may or may not be physically separated. Components or parts displayed as units may or may not be physical units, and may reside at one location or may be distributed to multiple networked units. Some or all of the units may be selectively adopted according to practical needs to achieve desired objectives of the disclosure.

In addition, various functional modules described in embodiments herein may be integrated into one processing module or may be present as a number of physically separated modules, and two or more modules may be integrated into one.

If the functionality is implemented as software functional units and sold or used as standalone products, they may be stored in a computer-readable storage medium. Based on such an understanding, the essential technical solution, or the portion that contributes to the prior art, or all or part of the technical solution of the disclosure may be embodied as software products. The computer software products can be stored in a storage medium and may include multiple instructions that, when executed, can cause a computing device (e.g., a personal computer, a server, a network device, etc.) or a processor to execute some or all operations of the methods described in various embodiments. The above storage medium may include various kinds of media that can store program codes, such as a universal serial bus (USB) flash disk, a mobile hard drive, a ROM, a RAM, a magnetic disk, or an optical disk.

The terms used in embodiments of the disclosure are only for the purpose of explaining specific embodiments of the disclosure rather than limiting the disclosure.

It will be appreciated that various numerical numbers involved in embodiments of the present disclosure are only for the convenience of description and are not intended to limit the scope of embodiments of the present disclosure.

It may be understood that, in various embodiments of the present disclosure, the magnitude of a sequence number of each process does not mean an order of execution, and the order of execution of each process may be determined by its function and internal logic and shall not constitute any limitation to an implementation process in embodiments of the disclosure.

The above are merely detailed description of the present disclosure and are not intended to limit the scope of protection of the present disclosure. Any modification and replacement made by those skilled in the art within the technical scope of the disclosure shall be included in the scope of protection of the disclosure. Therefore, the scope of protection of the disclosure should be stated in the scope of protection of the claims.

What is claimed is:

1. A method for data transmission, comprising:

receiving, by a terminal device, first information from an access network (AN) device, wherein the first information comprises related configurations and/or indications of an application data unit (ADU); and performing, by the terminal device, transmission of the ADU according to the first information or stopping, by the terminal device, the transmission of the ADU according to the first information;

wherein stopping, by the terminal device, the transmission of the ADU according to the first information comprises at least one of:

stopping, by the terminal device, the transmission of the ADU in response to determining by the terminal device, according to a first-timer parameter of the ADU in the first information, that a first timer times out; or stopping, by the terminal device, the transmission of the ADU according to an indication that the ADU does not meet a configuration requirement in the first information.

2. The method of claim 1, wherein the first information comprises at least one of:

a data radio bearer (DRB) and/or logical channel (LCH) corresponding to the ADU;

an LCH parameter corresponding to the ADU;

a transmission control parameter of the ADU; or an indication that the ADU does not meet a configuration requirement.

3. The method of claim 2, wherein the transmission control parameter of the ADU comprises a first-timer parameter of the ADU, and the first-timer parameter indicates maximum duration allowed for the transmission of the ADU.

4. The method of claim 1, wherein in case where the terminal device stops the transmission of the ADU, the method further comprises:

deleting, by the terminal device, a data packet of the ADU.

5. The method of claim 4, wherein deleting, by the terminal device, the data packet of the ADU comprises at least one of:

deleting, at a packet data convergence protocol (PDCP) layer of the terminal device, a data packet of the ADU in the PDCP layer;

deleting, at a radio link control (RLC) layer of the terminal device, a data packet of the ADU in the RLC layer; or deleting, at a media access control (MAC) layer of the terminal device, a data packet of the ADU in the MAC layer.

6. The method of claim 4, wherein the data packet of the ADU comprises at least one of:

a data packet, which does not meet a configuration requirement and is not transmitted, in an LCH/DRB/flow where the ADU is located;

a data packet, which does not meet the configuration requirement and is not transmitted successfully, in the LCH/DRB/flow where the ADU is located;

a data packet, which does not meet the configuration requirement and for which an acknowledgement (ACK) feedback is not received, in the LCH/DRB/flow where the ADU is located; or all data packets received by the terminal device corresponding to the ADU at a PDCP layer, an RLC layer, or an MAC layer of the terminal device.

7. The method of claim 1, further comprising:

turning on the first timer in response to the ADU reaching an access (AS) layer of the terminal device, the ADU starting to be transmitted, or the ADU having an available uplink (UL) grant to transmit.

8. The method of claim 1, wherein the ADU comprises application layer data of a frame or a coded slice.

9. An access network (AN) device, comprising:

a transceiver;

a memory configured to store computer-executed instructions; and a processor configured to execute the computer-executed instructions stored in the memory to cause the transceiver to:

receive second information from a core network (CN) device, wherein the second information indicates related information of an application data unit (ADU);

wherein the processor is further configured to generate first information according to the second information; and cause the transceiver to send the first information to a terminal device, wherein the first information comprises related configurations and/or indications of the ADU; and wherein the first information is used for at least one of: stopping, by the terminal device, transmission of the ADU in response to determining by the terminal device, according to a first-timer parameter of the ADU in the first information, that a first timer times out; or stopping, by the terminal device, the transmission of the ADU according to an indication that the ADU does not meet a configuration requirement in the first information.

10. The AN device of claim 9, wherein the second information comprises at least one of: quality of service (QoS) flow information of the ADU; a transmission requirement of the ADU; an associated indication of the ADU; an associated indication of a QoS flow; an overall transmission requirement of associated ADUs; or a transmission requirement of each ADU in the associated ADUs.

11. The AN device of claim 9, wherein the first information comprises at least one of:

a data radio bearer (DRB) and/or logical channel (LCH) corresponding to the ADU;

an LCH parameter corresponding to the ADU;

a transmission control parameter of the ADU; or an indication that the ADU does not meet a configuration requirement.

12. The AN device of claim 9, wherein the CN device is a session management function (SMF) network element (NE).

13. A core network (CN) device, comprising:

a transceiver;

a memory configured to store computer-executed instructions; and a processor configured to execute the computer-executed instructions stored in the memory to cause the transceiver to:

send second information to an access network (AN) device, wherein the second information indicates related information of an application data unit (ADU);

wherein the second information is used by the AN device to generate first information and send the first information to a terminal device, and the first information comprises related configurations and/or indications of the ADU; and wherein the first information is used for at least one of: stopping, by the terminal device, transmission of the ADU in response to determining by the terminal device, according to a first-timer parameter of the ADU in the first information, that a first timer times out; or stopping, by the terminal device, the transmission of the ADU according to an indication that the ADU does not meet a configuration requirement in the first information.

14. The CN device of claim 13, wherein the processor is further configured to cause the transceiver to perform at least one of:

obtaining the related information of the ADU; or generating the second information according to the related information of the ADU;

wherein the second information comprises at least one of: quality of service (QoS) flow information of the ADU; a transmission requirement of the ADU; an associated indication of the ADU; an associated indication of a QoS flow; an overall transmission requirement of associated ADUs; or a transmission requirement of each ADU in the associated ADUs.

15. The CN device of claim 13, wherein the related information of the ADU contains at least one of:

data stream information of the ADU; QoS flow information of the ADU; a transmission requirement of the ADU; an associated indication of the ADU; an associated indication of a QoS flow; or an associated indication of a data radio bearer (DRB) or radio link control (RLC).

16. The CN device of claim 13, wherein the CN device is a session management function (SMF) network element (NE).

17. The CN device of claim 14, wherein in terms of obtaining the related information of the ADU, the processor is configured to cause the transceiver to:

obtain the related information of the ADU from a policy control function (PCF) NE and/or an application function (AF) NE.

18. A terminal device, comprising:

a transceiver, a processor, and a memory storing computer-executed instructions; and wherein the computer-executed instructions stored in the memory are configured to perform the method of claim 1 when executed by the processor.

19. The terminal device of claim 18, wherein the first information comprises at least one of:

a data radio bearer (DRB) and/or logical channel (LCH) corresponding to the ADU;

an LCH parameter corresponding to the ADU;

a transmission control parameter of the ADU; or an indication that the ADU does not meet a configuration requirement.

* * * * *